US009628131B2

(12) United States Patent
Thompson et al.

(10) Patent No.: US 9,628,131 B2
(45) Date of Patent: *Apr. 18, 2017

(54) CASE FOR ELECTRONIC DEVICE WITH SURFACE FOR ATTACHING BUILDING ELEMENTS

(71) Applicant: Pono Paani, LLC, Austin, TX (US)

(72) Inventors: Hunter S. Thompson, Austin, TX (US); Jamie L. Thompson, Austin, TX (US); James W. Thompson, Austin, TX (US); Frazier Newlin, Austin, TX (US)

(73) Assignee: Pono Paani, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,110

(22) Filed: Jun. 1, 2015

(65) Prior Publication Data

US 2016/0119011 A1  Apr. 28, 2016

Related U.S. Application Data

(63) Continuation of application No. 13/927,911, filed on Jun. 26, 2013, now Pat. No. 9,044,689, which is a
(Continued)

(51) Int. Cl.
*H04M 1/00* (2006.01)
*H04B 1/3888* (2015.01)
(Continued)

(52) U.S. Cl.
CPC ............ *H04B 1/3888* (2013.01); *A45C 11/00* (2013.01); *A45F 5/00* (2013.01); *A63H 33/04* (2013.01);
(Continued)

(58) Field of Classification Search
CPC .... H04M 1/0283; A63H 33/04; G06F 1/1613; H04B 1/3888; A45C 11/00; A45C 5/00;
(Continued)

(56) References Cited

U.S. PATENT DOCUMENTS 244,632 A   7/1881  Loewenthal
260,568 A   7/1882  Hayden
(Continued)

FOREIGN PATENT DOCUMENTS

JP   2004129704 A    4/2004
WO      9936136 A1   7/1999
WO   2013043465 A1   3/2013

OTHER PUBLICATIONS

"Lego Electronics" downloaded Aug. 2, 2013 via Wayback Machine Oct. 28, 2010, from digiblue.com/products/lego/, pp. 1-2.
(Continued)

*Primary Examiner* — Tuan D Nguyen
(74) *Attorney, Agent, or Firm* — Meyertons, Hood, Kivlin, Kowert & Goetzel, P.C.

(57) ABSTRACT

A case for a portable electronic device includes a cavity and one or more studded surfaces. The cavity can receive at least a portion of the portable electronic device such that the portable electronic device is removable from the cavity through an opening in the cavity. The studded surfaces can be coupled with one or more building elements.

25 Claims, 5 Drawing Sheets

Related U.S. Application Data continuation of application No. 13/098,106, filed on Apr. 29, 2011, now Pat. No. 8,477,931.

(51) Int. Cl.
| | | |
|---|---|---|
| *H04M 1/02* | (2006.01) | |
| *A63H 33/04* | (2006.01) | |
| *G06F 1/16* | (2006.01) | |
| *A45C 11/00* | (2006.01) | |
| *A45F 5/00* | (2006.01) | |
| *A63H 33/08* | (2006.01) | |

(52) U.S. Cl.
CPC ......... *A63H 33/086* (2013.01); *G06F 1/1613* (2013.01); *H04M 1/0283* (2013.01); *A45C 2011/001* (2013.01); *A45C 2011/002* (2013.01); *A45C 2011/003* (2013.01); *Y10T 29/49826* (2015.01)

(58) Field of Classification Search
CPC . A45C 33/04; A45C 33/086; A45C 2011/001; A45C 2011/02; A45C 2011/03; Y10T 29/49826

See application file for complete search history.

(56) References Cited

U.S. PATENT DOCUMENTS

| | | | |
|---|---|---|---|
| 525,986 | A | 9/1894 | Krutsch |
| 528,126 | A | 10/1894 | Horton |
| 539,539 | A | 5/1895 | Palmer et al. |
| 540,539 | A | 6/1895 | Conness |
| 570,593 | A | 11/1896 | Bray |
| 603,838 | A | 5/1898 | Davis et al. |
| 614,603 | A | 11/1898 | Baumgartner |
| 644,633 | A | 3/1900 | Penticoff |
| 647,526 | A | 4/1900 | Runyan |
| 654,900 | A | 7/1900 | Knadler |
| 656,929 | A | 8/1900 | Blake |
| 658,373 | A | 9/1900 | Hull |
| 666,417 | A | 1/1901 | Gillet |
| 668,246 | A | 2/1901 | Wurts |
| 669,458 | A | 3/1901 | Fisher et al. |
| 671,933 | A | 4/1901 | Milne et al. |
| 673,159 | A | 4/1901 | Dickson et al. |
| 674,798 | A | 5/1901 | Smith et al. |
| 694,222 | A | 2/1902 | Wertenbruch |
| 3,005,282 | A | 10/1961 | Christiansen |
| 4,872,410 | A | 10/1989 | Lilly |
| 4,926,758 | A | 5/1990 | Lilly et al. |
| 5,046,739 | A | 9/1991 | Reichow |
| D338,053 | S | 8/1993 | Underhill et al. |
| 5,250,000 | A | 10/1993 | Boutin et al. |
| 5,476,261 | A | 12/1995 | Hultstrand |
| 5,645,277 | A | 7/1997 | Cheng |
| 5,976,018 | A | 11/1999 | Druckman |
| 6,193,609 | B1 | 2/2001 | D'Achard Van Enschut |
| 6,241,247 | B1 | 6/2001 | Sternberg et al. |
| 6,443,796 | B1 | 9/2002 | Shackelford |
| 6,710,766 | B1 | 3/2004 | Ogata |
| 7,586,032 | B2 | 9/2009 | Louis |
| 7,731,191 | B2 | 6/2010 | Sternberg |
| 7,938,260 | B2 | 5/2011 | Lin |
| 8,091,892 | B2 | 1/2012 | Sternberg |
| 8,477,931 | B2 | 7/2013 | Thompson et al. |
| D694,226 | S | 11/2013 | Thompson et al. |
| 9,044,689 | B2 | 6/2015 | Thompson et al. |
| 2002/0195771 | A1 | 12/2002 | Ku |
| 2002/0196250 | A1 | 12/2002 | Anderson et al. |
| 2003/0082986 | A1 | 5/2003 | Wiens et al. |
| 2003/0109314 | A1 | 6/2003 | Ku |
| 2004/0092207 | A1 | 5/2004 | Hansen |
| 2006/0279924 | A1* | 12/2006 | Richardson ........... G06F 1/1613 361/679.09 |
| 2009/0009945 | A1* | 1/2009 | Johnson ................ G06F 1/1613 361/679.27 |
| 2009/0101766 | A1 | 4/2009 | Kalis et al. |
| 2009/0111543 | A1 | 4/2009 | Tai et al. |
| 2011/0049005 | A1 | 3/2011 | Wilson et al. |
| 2011/0064401 | A1 | 3/2011 | Desorbo |
| 2011/0297578 | A1* | 12/2011 | Stiehl ................... B29C 45/1676 206/701 |
| 2011/0309728 | A1* | 12/2011 | Diebel ................. H04B 1/3888 312/293.1 |
| 2012/0217257 | A1 | 8/2012 | Ting |
| 2012/0261289 | A1 | 10/2012 | Wyner et al. |
| 2012/0274195 | A1 | 11/2012 | Thompson et al. |
| 2012/0325838 | A1 | 12/2012 | Huang |

OTHER PUBLICATIONS

Jerry Hildenbrand "Android gives eyes, ears, and a sense of direction to a Lego NXT robot", published Jul. 9, 2010 downloaded from www.androidcentral.com/android-g ives-eyes-ears-and-sense-direction-lego-nxt-robot, pp. 1-2.

Al Hilal "Digital Blue's LEGO MP3 Player" published Apr. 18, 2009, trendygadget.com, pp. 1-9.

"Lego iPad Stand" discussion posted Aug. 24, 2010 on www.ifans.com/forums/threads/lego-ipad-stand.307442/page-3, pp. 1-5.

"Amazon iPod Building Block Portable Speaker Dock" Amazon product page downloaded Mar. 28, 2011 from www.amazon.comliPod-Building-Biock-Portable-Speaker/dp/B001 KYV75W/ . . . , pp. 1-4.

"Amazon Lego 2GB MP3 Player" Amazon product page downloaded Mar. 28, 2011 from www.amazon.com/Digital-Blue-LG 14000-LEGO-Piayer/dp/B002L619ZE/ . . . , pp. 1-5.

Roland Hutchinson "Fun Gadgets—The Lego Phone", published Mar. 21, 2008, www.geeky-gadgets.com/fun-gadgets-the-lego-phone/, pp. 1-4.

Hatfield et al., "Lego Plus", Proceedings of the 2005 American Society for Engineering Education Annual Conference & Exposition, pp. 1-5.

Ripplinger, "The 'Legobox'", Published Jan. 8, 2002, mini-itx.com/projects/legobox/, pp. 1-5.

"Lego Xbox Case", discussion posted Feb. 21-Mar. 2, 2005, forums.xbox-scene.com/ .. ./t360699, pp. 1-8.

Van Wagner, "On Screen Programming version 1.0 for Lego Mindstorms", Copyright 1999, downloaded Mar. 26, 2011 from alumni.cse.ucsc.edu/-davevw/onscreen/, pp. 1-4.

McNerney, "From turtles to Tangible Programming Bricks: explorations in physical language design", Published Jul. 29, 2004, pp. 1-12.

"DIY Lego Case Mod PC", Published Aug. 9, 2008, downloaded from zedomax.com/blog/ .. ./diy-lego-case-mod-pc, pp. 1-3.

Sawaya, "BlackBerry Tour 9630 Artistic in Lego", http:f/www.phonesreview.co.uk/201 0/03/14/blackberry-tour-9630-artisticin-lego/, Mar. 14, 2010, pp. 1-3.

Sawaya, "PC MAG Computer—The Art of Brick", http:l/brickartist.com/gallery/pc-magazine-computer/?tag=technology, Feb. 2006, pp. 1-4.

U.S. Appl. No. 13/098,106, filed Apr. 29, 2011, Hunter S Thompson et al.

U.S. Appl. No. 29/390,894, filed Apr. 29, 2011, Hunter S. Thompson.

U.S. Appl. No. 13/927,911, filed Jun. 26, 2013, Hunter S. Thompson.

Office Action from U.S. Appl. No. 13/098,106, issued Nov. 6, 2012, pp. 1-11.

Office Action from U.S. Appl. No. 13/927,911, issued Jun. 5, 2014, pp. 1-5.

European Search Report from Application No. 14188209.2, issued Feb. 24, 2015, 7 pages.

Notice of Allowance in U.S. Appl. No. 13/098,106, mailed May 28, 2013, 26 pages.

Notice of Allowance in U.S. Appl. No. 13/098,106, mailed Apr. 1, 2013, 10 pages.

(56) References Cited

OTHER PUBLICATIONS

Notice of Allowance in U.S. Appl. No. 13/927,911, mailed Jan. 28, 2015, 10 pages.
Birming, "LEGO Star Wars Case for Nintendo DS", Oct. 5, 2009, URL: www.geekalerts.com/lego-star-wars-case-nintendo-ds/, 7 pages.
Poulter, "Bricks ain't what they used to be as LEGO 'develops mobile phone'", Feb. 13, 2009, URL: www.dailymail.co.uk/sciencetech/article-1144714/Bricks-aint-used-Lego-develops-mobile-phone.html, 22 pages.
"19 Weird and Wonderful Ways to Hold your iPhone in Place", Oct. 27, 2009, URL: ismashphone. com/2009/10/19-weird-and wonderful-ways-to-hold-your-iphone-in-p lace-iphone-dyi-docks.htm l, 13 pages.
Office Action, U.S. Appl. No. 90/013,523, mailed Oct. 23, 2015, 15 pages.
Office Action, U.S. Appl. No. 90/013,522, mailed Oct. 23, 2015, 14 pages.
Request for Ex Parte Reexamination, U.S. Pat. No. 8,477,931, filed Apr. 29, 2011, 179 pages.
Order Granting the Request for Ex Parte Reexamination, U.S. Pat. No. 8,477,931, mailed Jul. 2, 2015, 15 pages.
Request for Ex Parte Reexamination (Replacement), U.S. Pat. No. 9,044,689, filed Jun. 26, 2013, 43 pages.
Order Granting the Request for Ex Parte Reexamination, U.S. Pat. No. 9,044,689, mailed Jul. 2, 2015, 19 pages.
Preliminary Statement of Invalidity, Civil Action No. 1:14-cv-1089-SS, filed Jul. 17, 2015, 20 pages.
Defendant's Invalidity Contentions, Civil Action No. 15-cv-00823-VLB, submitted Nov. 2, 2015, 103 pages.
"Dorian's Lego Computers", May 26, 2011, 3 pages. [www.poseidonguild.com/legos/index.php].
Resnick et al., "Programmable Bricks: Toys to think with", IBM Systems Journal, vol. 35, No. 3&4, Date of current version: Apr. 6, 2010, Issued 1996, 10 pages.
Borovoy et al., "GroupWear: Nametags that Tell about Relationships", MIT Media Laboratory, Apr. 18-23, 1998, 2 pages.
Resnick, "Technologies for Lifelong Kindergarten", MIT Media Laboratory, Dec. 1998, Educational Technology Research & Development, vol. 46, No. 4, 15 pages.
Office Action from U.S. Appl. No. 14/050,493 mailed Jul. 23, 2015, 21 pages.
Final Office Action from U.S. Appl. No. 14/050,493 mailed Dec. 16, 2015, 20 pages.
Final Office Action, U.S. Appl. No. 90/013,523, mailed Apr. 12, 2016, 16 pages.
Final Office Action, U.S. Appl. No. 90/013,522, mailed Apr. 29, 2016, 20 pages.
Ferrari et al., "Building Robots with LEGO Mindstorms", Front and back cover, preface, foreword, chapter 4, 6, 9, 13, 16, 18, 20-21, 26-28, appendix, and back cover, Dec. 6, 2001, 228 pages, Syngress.
Philohome, "LEGO Mindstorms & LEGO Technic", Web, 20 pages, Dec. 4, 2004 [https://web.archive.org/web/20041204044616/http://www.philohome.com/mindstorms.htm] (accessed Jun. 10, 2016).
Plazaearth, "MindStorms RCX Sensor Input Page", Web, 9 pages, Dec. 4, 2004 [https://web.archive.org/web/20041204111548/http:/www.plazaearth.com/usr/gasperi/lego.htm] (accessed Jun. 10, 2016).
Ex Parte Advisory Action, U.S. Appl. No. 90/013,523, mailed Jul. 20, 2016, 15 pages.
Ex Parte Advisory Action, U.S. Appl. No. 90/013,522, mailed Aug. 11, 2016, 16 pages.
Non-final Office Action, U.S. Appl. No. 14/050,493, mailed Jul. 23, 2015, 21 pages.

* cited by examiner

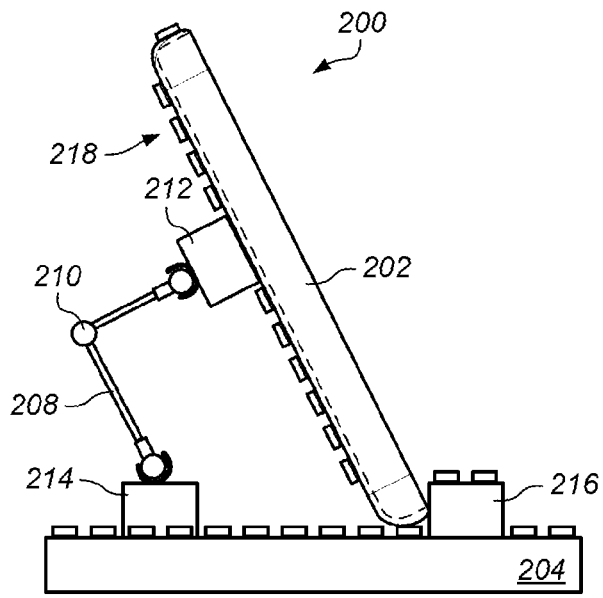
FIG. 6
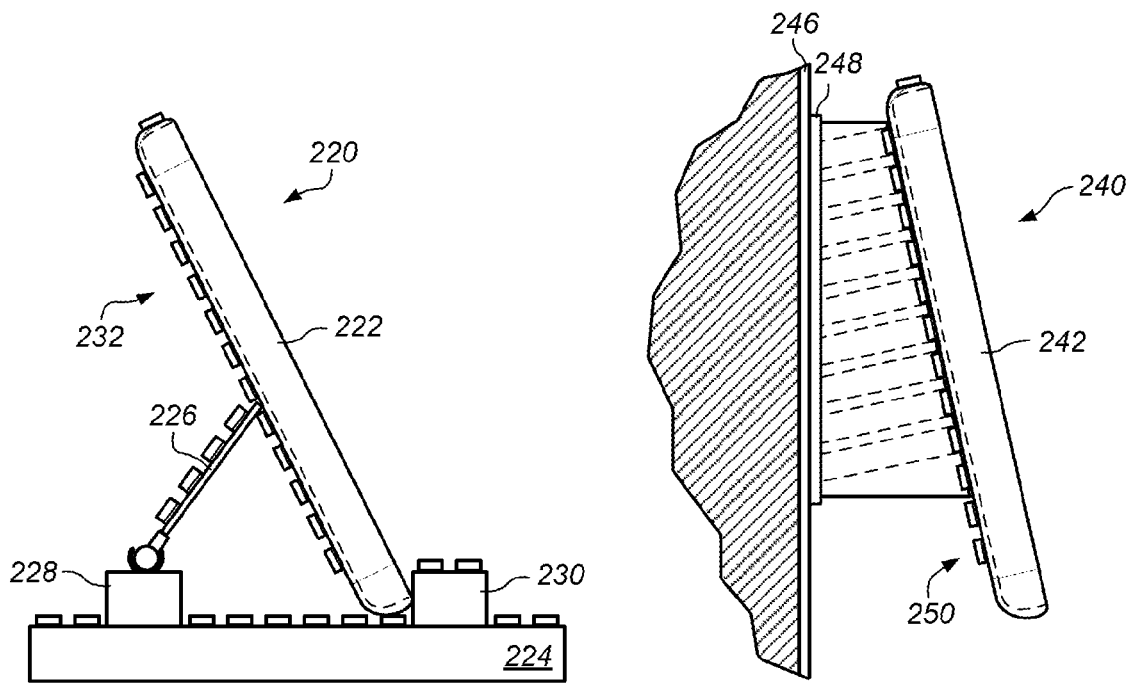
FIG. 7
FIG. 8

CASE FOR ELECTRONIC DEVICE WITH SURFACE FOR ATTACHING BUILDING ELEMENTS

PRIORITY CLAIM

This application is a continuation of U.S. patent application Ser. No. 13/927,911 filed Jun. 26, 2013, which is a continuation of U.S. patent application Ser. No. 13/098,106 filed Apr. 29, 2011, all of which are incorporated herein by reference in their entirety.

BACKGROUND

Field

The present invention relates generally to cases for portable electronic devices. More particularly, the present disclosure relates to cases for portable electronic devices that allow for attachment of building elements.

Description of the Related Art

Portable electronic devices, such as smart phones, portable media players, and personal digital assistants, have been growing in popularity. Typically, a portable electronic device includes a housing to contain the electronics for the device, a front panel with a display screen, and one or more connector ports for cable connections with external computer systems and chargers.

Portable electronic devices may be used in variety of indoor and outdoor environments. In these environments, the devices may encounter external loads (such as a shock loads or vibration) and exposure to foreign materials (such as dust, debris, or liquids). In some circumstances, excessive loads or contamination cause a portable electronic device to malfunction.

Portable electronic devices usually operate on internal batteries. When the charge on the battery in a device runs low, the device must be connected to an external charging system. In some cases, a device may run low on charge in a location where the user does not have access to an external charging system (such as in a park or in the passenger section of an airplane). The user thus may be forced to suspend use of the device until the user reaches a location with a charging system.

SUMMARY

Embodiments for a case for a portable electronic device are described herein. In an embodiment, a case for a portable electronic device includes a cavity and one or more studded surfaces. The cavity can receive at least a portion of the portable electronic device such that the portable electronic device is removable from the cavity through an opening in the cavity. The studded surfaces can be coupled with one or more building elements.

In an embodiment, a case for a portable electronic device includes a cavity and one or more studded surfaces. The cavity can receive at least a portion of the portable electronic device. The studded surfaces can be coupled with one or more building elements. The studded surfaces are on a side of the case opposite to a display screen of the portable electronic device when the portable electronic device is installed in the cavity.

In an embodiment, a portable electronic device holder includes a case and one or more building elements. The case includes a cavity and one or more studded surfaces. The cavity can receive at least a portion of the portable electronic device. The building elements are coupled to one or more of the studded surfaces on the case. The building elements and the case can hold the portable electronic device in a desired position.

In an embodiment, a method of making a system from building elements includes providing a case for portable electronic device. The case includes an opening for removing the portable electronic device and one or more studded surfaces. Building elements are coupled to the case.

BRIEF DESCRIPTION OF THE DRAWINGS

FIG. 6 illustrates one embodiment of an adjustable stand for a portable electronic device including a case with a studded surface and a linkage.

FIG. 7 illustrates one embodiment of an adjustable stand for a portable electronic device including a case with a studded surface and adjustable strut.

FIG. 8 illustrates one embodiment of vertically-mounted holder for a portable electronic device including a case with a studded surface.

Figure 1:
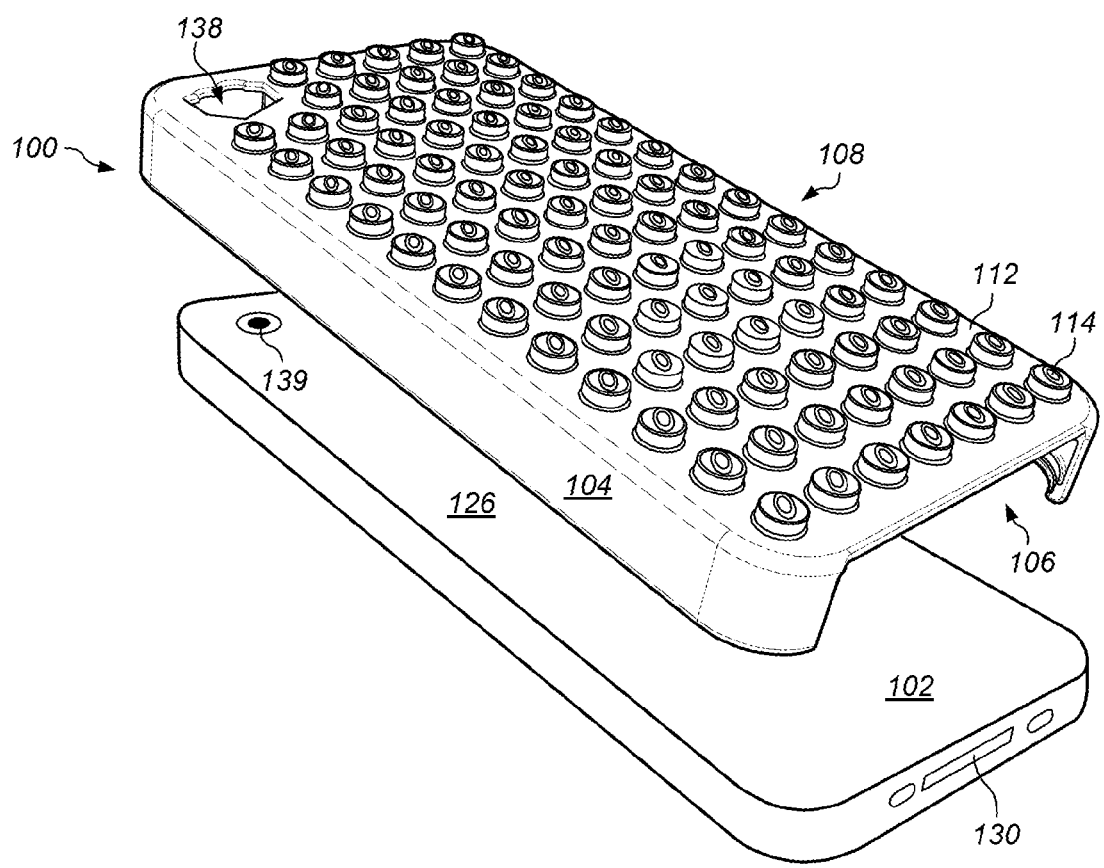
FIG. 1 illustrates one embodiment of a system including a portable electronic device and a case having studs to which building elements can be attached.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As used herein, "building element" means an element that can be combined with one or more other elements to form a structure. Structures made from building elements may include play structures (for example, a house made of bricks), toys, sculptures, and functional structures (such as a stand, base, cover, or linkage). Examples of building elements include bricks, plates, wheels, figurines, rods, tubes, sleeves, connectors, or hinges.

As used herein, "portable electronic device" means any electronic device that is not attached to a structure at a fixed location and that can be operated, at least for some period of time, without a physical connection to a fixed power source. Examples of portable electronic devices include mobile phones, portable media players, notebook computers, computer tablets, wireless devices, and personal digital assistants (PDAs).

As used herein, "press fit" includes any coupling in which elements couple when one or more contacting portions of the elements are pushed together. In some embodiments, a press fit includes a friction fit, in which two parts are held together at least in part by friction between the mating surfaces. In some embodiments, a press fit includes an interference fit, in which the coupled elements interference with one another (for example, a shaft that is slightly larger than a hole into which it is inserted). In some embodiments, a press fit may include resilient engagement (for example, a pin inserted into a hole in an elastomeric sleeve whose inner diameter is less than the diameter of the pin.

As used herein, "sculpture" means a three-dimensional creation, work of art, or construction.

As used herein, "stud" includes any projection on a surface of an element. A stud may include a bump, a protuberance a boss, or a pin. A stud may have any suitable shape, including round, square, rectangular, trapezoidal, or oval. In some embodiments, a stud may be formed within physical tolerances that allow one or more studs on a surface to be coupled to another element.

As used herein, "studded surface" means a surface of an element that includes one or more studs.

In some embodiments, a case for a portable electronic device includes one or more surfaces for attaching building elements to the case. The portable electronic device may be removable from the case. FIG. 1 illustrates one embodiment of a system including a portable electronic device and a case having studs to which building elements can be attached. System 100 includes portable electronic device 102 and case 104. The electronic device may be, for example, a smart phone such as an iPhone® mobile digital device, produced by Apple Inc. Portable electronic device 102 is removable from case 104.

Case 104 includes cavity 106 and rear studded surface 108. Cavity 106 receives portable electronic device 102. In some embodiments, portable electronic device 102 snaps into cavity 106.

Rear studded surface 108 includes base plate 112 and studs 114. Studs 114 may be arranged in a pattern that includes a series of rows across the surface of base plate 112. Studs 114 may serve as attachment points for building elements.

Figure 2:
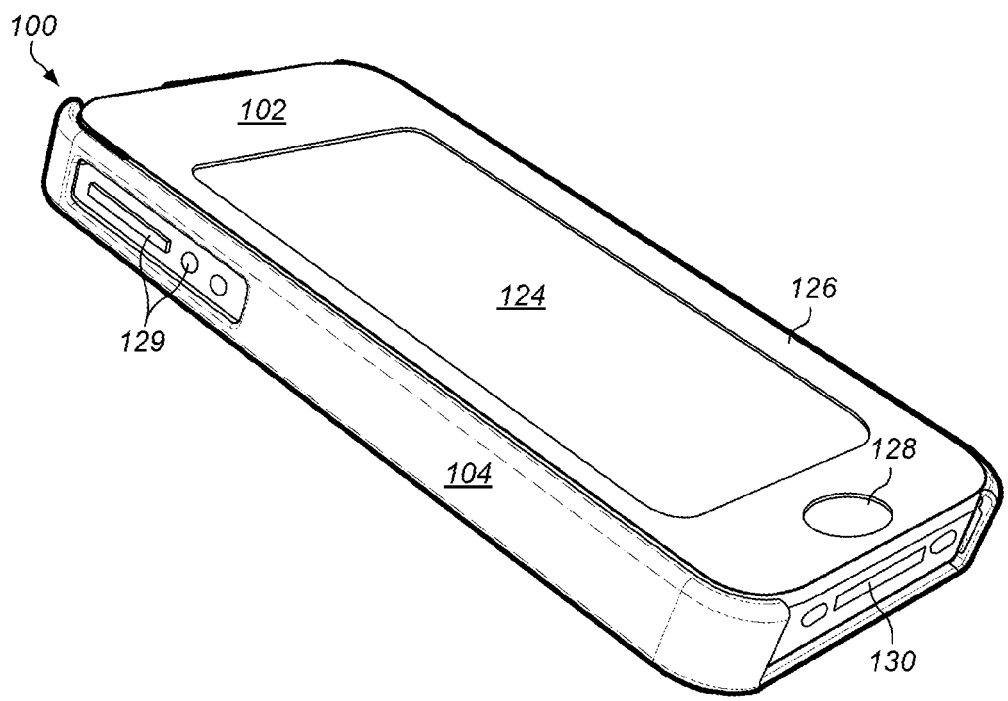
FIG. 2 illustrates an embodiment of a portable electronic device installed in a case having studded surfaces.

FIG. 2 illustrates an embodiment of a portable electronic device installed in a case having studded surfaces. Portable electronic device 102 includes front display screen 124, housing 126, home button 128, side controls 129, and connector 130. Portable electronic device 102 is seated in cavity 106 of case 104. Studded rear surface 108 (shown in FIG. 1) is opposite front display screen 124. Studded rear surface 108 may be in plane that is parallel to front display screen 124.

Figure 3:
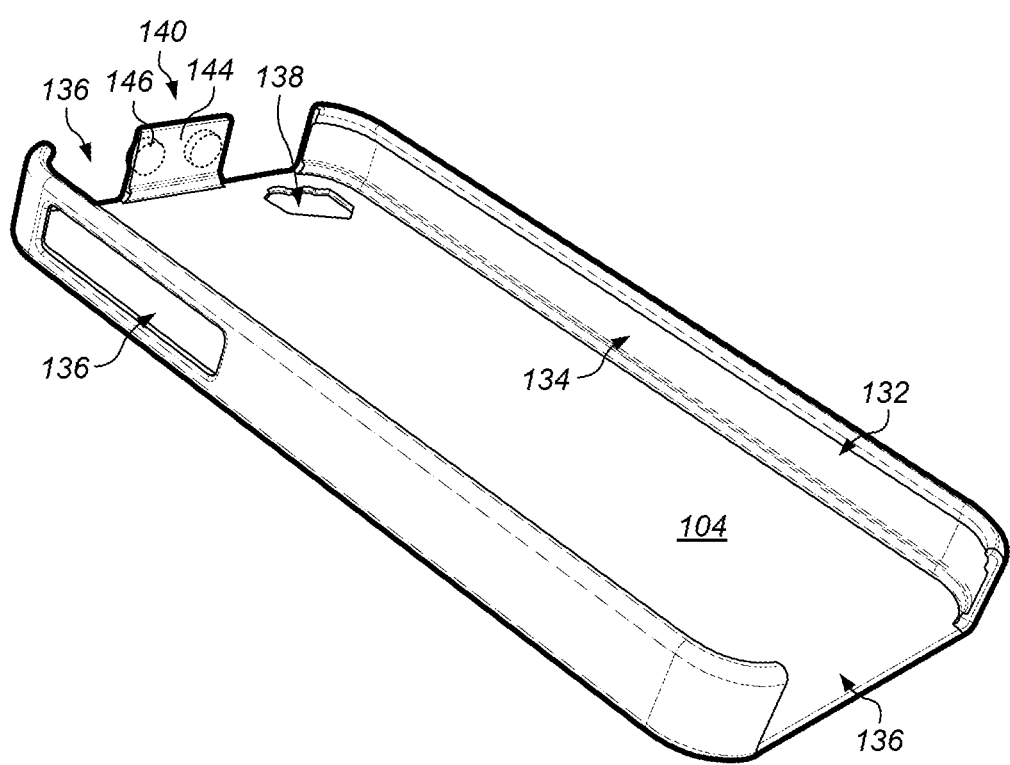
FIG. 3 illustrates the interior of one embodiment of a case for a portable electronic device.

FIG. 3 illustrates the interior of one embodiment of a case for a portable electronic device. Cavity 106 includes opening 132 and grooves 134. Opening 132 may allow portable electronic device 102 to be installed and removed from case 104. Grooves 134 may receive a portion of the edges of a portable electronic device to retain the device in case 104.

Case 104 includes cutouts 136. Cutouts 136 may be located to correspond to various elements of a particular type of a portable electronic device, such as connectors or control buttons. Opening 138 is provided for camera lens 139 of portable electronic device 102.

Top studded surface 140 is located on the upper rim of case 104. Top studded surface 140 includes base plate 144 and studs 146. Studs 146 may serve as attachment points for building elements.

Case 104 may be made from any suitable material. In some embodiments, case 104 is injected molded. In some embodiments, a case is made of an acrylonitrile butadiene styrene ("ABS") copolymer. In one embodiment, the case is made of high flow-grade ABS, such as PA-737 POLYLAC® high flow ABS or PA-758 ABS, both produced by Chi Mei Corporation.

In certain embodiments, one or more of the edges of a case may be flexible. In some embodiments, the edges of a case may resiliently engage with the sides of a portable electronic device.

In some embodiments, building elements can be coupled to studs on a studded surface of a case by way of a press fit. The connection between the studded surfaces and the building elements may be, for example, based on a clamping effect such as described in U.S. Pat. No. 3,005,282, "Toy Building Brick", to G. K. Christiansen, which hereby is incorporated by reference as if fully set forth herein.

In some embodiments, tolerances on the size, shape, and spacing of studs on a case are controlled within specified tolerances such that standard blocks available from one or more building block manufacturers can be attached to the studs. In one embodiment, the studded surfaces allow for the attachment of LEGO® building elements, produced by LEGO Group. In one embodiment, each of studs 114 and studs 146 on studded surfaces 110 are 4.856 millimeters in diameter and 1.869 millimeters in height. In one embodiment, the distance between centers of adjacent studs 114 and between centers of adjacent studs 146 is 7.992 millimeters. In some embodiments, size and position tolerances are within +0.015/−0.015 millimeters.

Figure 5:
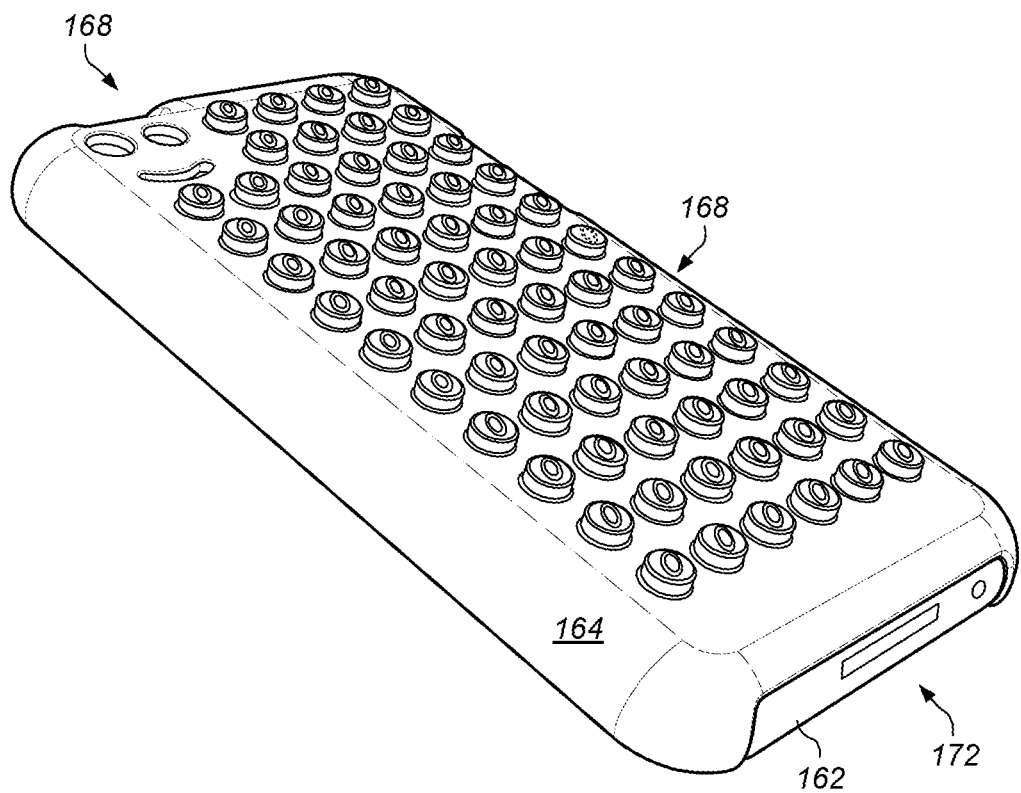
FIG. 5 is a rear perspective view illustrating one embodiment of a portable media player installed in a case having studded surfaces.
Figure 4:
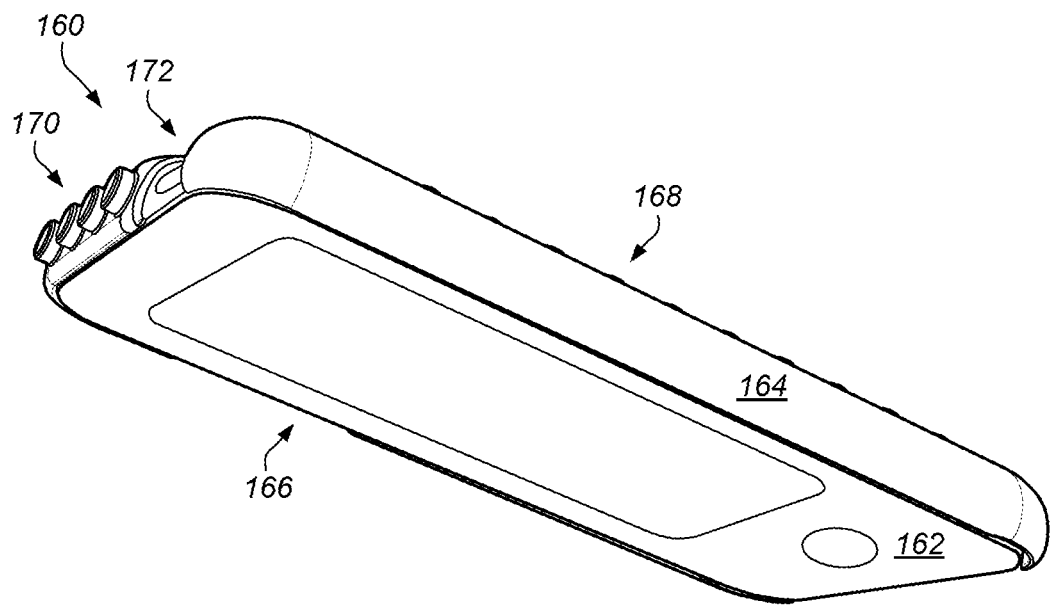
FIG. 4 is a front perspective view illustrating one embodiment of a portable media player installed in a case having studded surfaces.

In some embodiments, a case for a portable media player allows attachment of building elements at one or more surfaces of the case. FIG. 4 is a front perspective view illustrating one embodiment of a portable media player installed in a case having studded surfaces for attaching building elements. FIG. 5 is a rear perspective view illustrating one embodiment of a portable media player installed in a case having studded surfaces. System 160 includes portable media player 162 and case 164. Portable media player 162 may be, for example, a media player such as an iPod Touch® portable digital device, produced by Apple Inc. Case 164 includes cavity 166, rear studded surface 168, top studded surface 170, and cutouts 172.

In some embodiments, building elements are coupled to a case for a portable electronic device to create a holder for the portable electronic device. The holder may provide for placement or positioning of the device relative to a fixed external structure, such as a table, shelf, wall, or cabinet door. In some embodiments, a holder allows a user to adjust the position of the portable electronic device relative to a fixed external structure (for example, reorienting a display screen for the portable electronic device). In certain embodiments, the holder may accommodate, or provide routing for, cables connected to the portable electronic device.

In some embodiments, building elements attached to a case are arranged to provide a base for placement of a portable electronic device on a horizontal surface, such as a table top. FIG. 6 illustrates one embodiment of an adjustable stand for a portable electronic device including a case with a studded surface and a linkage. System 200 includes case 202, base 204, and linkage 206. In one embodiment, case 202 is similar to case 104 shown in FIG. 1. Linkage 206 includes rods 208, hinge coupler 210, hinge block 212, hinge block 214, and stop block 216. Hinge block 212 is coupled to studs on studded surface 218 of case 202. Hinge block 214 is coupled to studs on base 204. Hinge block 212, hinge block 214, and hinge coupler 210 may allow linkage to be adjusted to change the angle of case 204 relative to a horizontal surface supporting base 204.

FIG. 7 illustrates one embodiment of an adjustable stand for a portable electronic device including a case with a studded surface and adjustable strut. System 220 includes case 222, base 224, strut 226, hinge block 228, and stop block 230. In one embodiment, case 222 is similar to case 104 shown in FIG. 1. Strut 226 may be pivotally connected to base 224 by way of hinge block 228. Strut 226 may engage under a row of studs on studded surface 232. If the user desires to change the angle of a display screen in case 222 relative to base 204, strut 226 may be rotated on hinge block 228 such that the distal end of strut 226 engages a higher or lower row of studs on studded surface 232.

In some embodiments, building elements attached to a case are arranged to provide for holding a portable electronic device on a vertical surface, such as a wall. FIG. 8 illustrates one embodiment of vertically-mounted holder for a portable electronic device including a case having a studded surface. System 240 includes case 242 and wall mount 244. In one embodiment, case 242 is similar to case 104 shown in FIG. 1. Wall mount 244 may be attached to wall 246 with pad 248. Pad 248 may be, for example, a double-sided self-adhesive pad. Case 242 may be coupled to wall mount 244 by way of a press fit between studs on studded surface 250 and corresponding elements on wall mount 244. In the embodiment shown in FIG. 8, wall mount 244 holds a portable electronic device at an upward tilt relative to wall 246. In some embodiments, however, wall mount may hold a device such that the display screen is parallel to the wall, or tilted downward relative to the wall.

Figure 9:
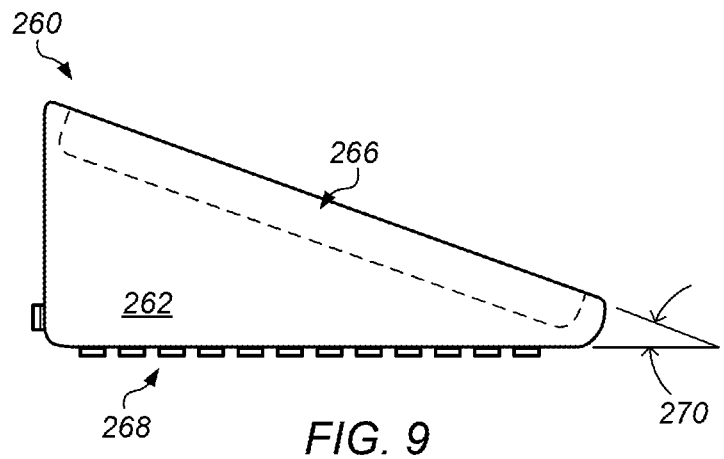
FIG. 9 illustrates one embodiment of a wedge-shaped portable electronic device case having a studded rear surface.

In some embodiments, a case for a portable electronic device includes a studded surface that is at an angle relative to the display screen of the portable electronic device. FIG. 9 illustrates one embodiment of a wedge-shaped portable electronic device case having a studded rear surface. Case 260 includes body 262, cavity 266, and studded surface 268. Studded surface 268 may be opposite the display screen of a portable electronic device installed in cavity 266. Body 262 may be in the form of a wedge such that the display screen is at an angle relative to the surface on which case 260 is resting. For example, in one embodiment, angle 270 shown in FIG. 9 is about 25 degrees.

Figure 10:
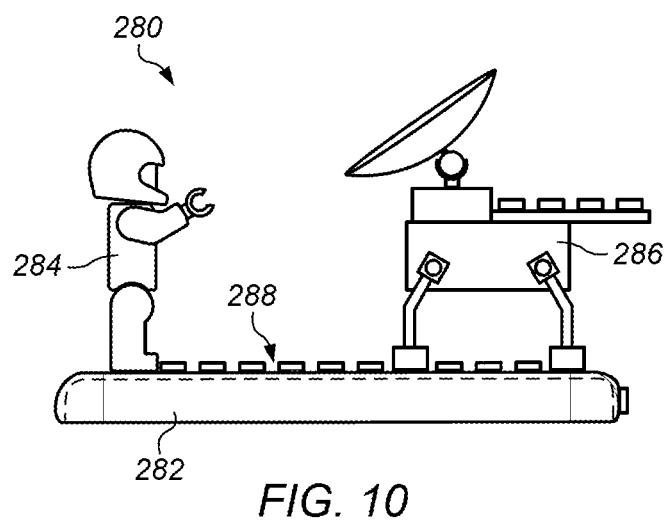
FIG. 10 illustrates one embodiment of a sculpture created on a case for a portable electronic device.

In some embodiments, a case for a portable electronic device can be used as a base surface for creating sculptures from building elements. FIG. 10 illustrates one embodiment of a sculpture created on a case for a portable electronic device. Sculpture 280 is assembled on case 282. In one embodiment, case 282 is similar to case 104 shown in FIG. 1. Elements of sculpture 280 include figurine 284 and probe model 286. Figurine 284 and probe model 286 are coupled to the top of case 282 by way of studs on studded surface 288.

Figure 11:
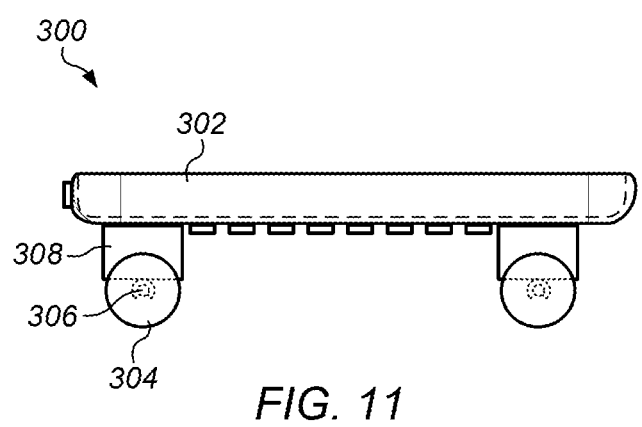
FIG. 11 illustrates an embodiment of a case to which wheels have been attached.

FIG. 11 illustrates an embodiment of a case to which wheels have been attached. System 300 includes case 302 and wheels 304. Wheels 304 roll on axles 306. Axles 306 are attached to case 302 by way of axle mounting blocks 308. System 300 may have any number of wheels.

In the embodiments shown above, surfaces of cases include studs that can serve as attachment points for building elements. A case for a portable electronic device may, however, include in various embodiments other elements or structures for attaching building elements. Examples of such elements and structures include sockets, loops, tabs, hooks, and ridges.

In the embodiment shown in FIG. 1, studs are evenly spaced in two dimensions (for example, along an "x-axis" and a "y-axis") across the surface of the case. Attachment elements may, however, be arranged in various embodiments with any spacing between elements. In some embodiments, for example, the spacing between rows of studs in one direction is different from the spacing of rows in another direction.

Although in various embodiments described above, a case included studs that can be received in corresponding receptacles on building elements, the elements may in various embodiments be reversed. Thus, for example in certain embodiments a case may have receptacles for receiving studs on building elements instead of, or in addition to, having studs on the case.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A case for a working portable electronic device, comprising:

a cavity comprising one or more openings, wherein the cavity is configured to receive at least a portion of the working portable electronic device such that the working portable electronic device is removable from the cavity through at least one of the openings, wherein the cavity is at least partially defined by a cavity bottom surface and one or more rims of the case, wherein the one or more rims of the case comprise a pair of opposing side rim portions along the long dimension of the case, wherein each of the pair of opposing side rim portions comprises:

an interior groove comprising a groove bottom, an upper edge, and a lower edge;

an upper elongated projection that projects inwardly relative to the groove bottom; and a lower elongated projection that projects inwardly relative to the groove bottom and at least a portion of which is above the cavity bottom surface, wherein the upper edge of the interior groove is formed by the upper elongated projection, wherein the pair of opposing side rim portions are configured to resiliently receive opposing edges of the working portable electronic device in the interior grooves in the pair of side rim portions on the long dimension of the case to couple the working electronic portable device in the cavity of the case; and one or more studded surfaces comprising one or more arrays of studs configured to couple with one or more standard building elements of a play set, wherein at least one of the studded surfaces of the case is on a side of the case that is opposite to a display screen of the working portable electronic device when the working portable electronic device is installed in the cavity, wherein the upper elongated portion on at least one of the side rims is an inwardly projecting lip configured to retain the working portable electronic device in the case.

2. The case of claim 1, wherein the lower elongated projection of at least one of the side rims comprises a ledge above the cavity bottom surface.

3. The case of claim 1, wherein at least a portion of the side rims of the case comprises a flexible material configured to resiliently couple with the working portable electronic device, wherein the case further comprises, on at least one end of the case, an open slot between the pair of opposing flexible side rim portions.

4. The case of claim 1, further comprising at least one opening for a connector in the working portable electronic device.

5. The case of claim 1, wherein the working portable electronic device is a cellular phone.

6. The case of claim 1, wherein the working portable electronic device is a tablet computer.

7. A case for a working portable electronic device, comprising:

a cavity comprising one or more openings, wherein the cavity is configured to receive at least a portion of the working portable electronic device such that the working portable electronic device is removable from the cavity through at least one of the openings, wherein the cavity is at least partially defined by a cavity bottom surface and one or more rims of the case, wherein the one or more rims of the case comprise a pair of opposing side rim portions along the long dimension of the case, wherein each of the pair of opposing side rim portions comprises:
an interior groove comprising a groove bottom, an upper edge, and a lower edge;
an upper elongated projection that projects inwardly relative to the groove bottom; and
a lower elongated projection that projects inwardly relative to the groove bottom and at least a portion of which is above the cavity bottom surface,
wherein the upper edge of the interior groove is formed by the upper elongated projection, wherein the pair of opposing side rim portions are configured to resiliently receive opposing edges of the working portable electronic device in the interior grooves in the pair of side rim portions on the long dimension of the case to couple the working electronic portable device in the cavity of the case; and one or more studded surfaces comprising one or more arrays of studs configured to couple with one or more standard building elements of a play set, wherein at least one of the studded surfaces of the case is on a side of the case that is opposite to a display screen of the working portable electronic device when the working portable electronic device is installed in the cavity wherein at least one of the grooves comprises a substantially flat bottom.

8. The case of claim 7, wherein at least a portion of the side rims of the case comprises a flexible material configured to resiliently couple with the working portable electronic device, wherein the case further comprises, on at least one end of the case, an open slot between the pair of opposing flexible side rim portions.

9. The case of claim 7, further comprising at least one opening for a connector in the working portable electronic device.

10. The case of claim 7, wherein the lower elongated projection of at least one of the side rims comprises a ledge above the cavity bottom surface.

11. The case of claim 7, wherein the lower elongated projection of at least one of the side rims comprises a ledge above the cavity bottom surface.

12. The case of claim 7, wherein the working portable electronic device is a cellular phone.

13. The case of claim 7, wherein the working portable electronic device is a tablet computer.

14. A case for a working portable electronic device, comprising:

a cavity comprising one or more openings, wherein the cavity is configured to receive at least a portion of the working portable electronic device such that the working portable electronic device is removable from the cavity through at least one of the openings, wherein the cavity is at least partially defined by a cavity bottom surface and one or more rims of the case, wherein the one or more rims of the case comprise a pair of opposing side rim portions along the long dimension of the case, wherein each of the pair of opposing side rim portions comprises:
an interior groove comprising a groove bottom, an upper edge, and a lower edge;
an upper elongated projection that projects inwardly relative to the groove bottom; and
a lower elongated projection that projects inwardly relative to the groove bottom and at least a portion of which is above the cavity bottom surface,
wherein the upper edge of the interior groove is formed by the upper elongated projection, wherein the pair of opposing side rim portions are configured to resiliently receive opposing edges of the working portable electronic device in the interior grooves in the pair of side rim portions on the long dimension of the case to couple the working electronic portable device in the cavity of the case; and one or more studded surfaces comprising one or more arrays of studs configured to couple with one or more standard building elements of a play set, wherein at least one of the studded surfaces of the case is on a side of the case that is opposite to a display screen of the working portable electronic device when the working portable electronic device is installed in the cavity, wherein at least one of studded surfaces of the case on the side of the case that is opposite to the display screen of the working portable electronic device is on a back of the case and comprises an array of studs that substantially covers the back of the case.

15. The case of claim 14, wherein the building elements are configured to couple to at least one of the studded surfaces by way of a press fit.

16. The case of claim 14, wherein at least a portion of the side rims of the case comprises a flexible material configured to resiliently couple with the working portable electronic device, wherein the case further comprises, on at least one end of the case, an open slot between the pair of opposing flexible side rim portions.

17. The case of claim 14, further comprising at least one opening for a connector in the working portable electronic device.

18. The case of claim 14, wherein the lower elongated projection of at least one of the side rims comprises a ledge above the cavity bottom surface.

19. The case of claim 14, wherein the lower elongated projection of at least one of the side rims comprises a ledge above the cavity bottom surface.

20. The case of claim 14, wherein the working portable electronic device is a cellular phone.

21. The case of claim 14, wherein the working portable electronic device is a tablet computer.

22. A case for a working portable electronic device, comprising:
   a cavity comprising one or more openings, wherein the cavity is configured to receive at least a portion of the working portable electronic device such that the working portable electronic device is removable from the cavity through at least one of the openings,
   wherein the cavity is at least partially defined by a cavity bottom surface and one or more rims of the case,
   wherein the one or more rims of the case comprise a pair of opposing side rim portions along the long dimension of the case,
   wherein each of the pair of opposing side rim portions comprises:
      an interior groove comprising a groove bottom, an upper edge, and a lower edge;
      an upper elongated projection that projects inwardly relative to the groove bottom; and
      a lower elongated projection that projects inwardly relative to the groove bottom and at least a portion of which is above the cavity bottom surface,
      wherein the upper edge of the interior groove is formed by the upper elongated projection,
   wherein the pair of opposing side rim portions are configured to resiliently receive opposing edges of the working portable electronic device in the interior grooves in the pair of side rim portions on the long dimension of the case to couple the working electronic portable device in the cavity of the case; and
   one or more studded surfaces comprising one or more arrays of studs configured to couple with one or more standard building elements of a play set, wherein at least one of the studded surfaces of the case is on a side of the case that is opposite to a display screen of the working portable electronic device when the working portable electronic device is installed in the cavity,
   wherein the working portable electronic device is a cellular phone.

23. The case of claim 22, wherein at least a portion of the side rims of the case comprises a flexible material configured to resiliently couple with the working portable electronic device, wherein the case further comprises, on at least one end of the case, an open slot between the pair of opposing flexible side rim portions.

24. The case of claim 22, wherein the lower elongated projection of at least one of the side rims comprises a ledge above the cavity bottom surface.

25. The case of claim 22, wherein the lower elongated projection of at least one of the side rims comprises a ledge above the cavity bottom surface.

* * * * *